United States Patent
Codilian et al.

[19]

[11] Patent Number: 5,946,157
[45] Date of Patent: Aug. 31, 1999

[54] METHOD OF SEAMLESSLY RECORDING CIRCUMFERENTIALLY SUCCESSIVE SERVO BURSTS THAT OVERLAP ONE ANOTHER

[75] Inventors: Raffi Codilian, San Dimas; Timothy Elliott, Huntington Beach; Ara W. Nazarian, Tustin; Brian Tanner, San Jose, all of Calif.

[73] Assignee: Western Digital Corporation, Irvine, Calif.

[21] Appl. No.: 08/895,248

[22] Filed: Jul. 21, 1997

[51] Int. Cl.$^6$ .................................................. G11B 5/02
[52] U.S. Cl. ................................................. 360/75; 360/68
[58] Field of Search .................................. 360/75, 48, 51, 360/61, 67, 68, 77.02, 77.05, 77.08, 78.04, 78.14

[56] References Cited

U.S. PATENT DOCUMENTS

| | | | |
|---|---|---|---|
| 5,241,435 | 8/1993 | Saito et al. | 360/75 X |
| 5,434,725 | 7/1995 | Hirose et al. | 360/78.04 X |
| 5,519,546 | 5/1996 | Lewis | 360/48 |
| 5,867,337 | 2/1999 | Shimomura | 360/75 |

*Primary Examiner*—Aristotelis M. Psitos
*Assistant Examiner*—James L Habermehl
*Attorney, Agent, or Firm*—Leo J. Young, Esq.; Miladd G. Shara, Esq.

[57] ABSTRACT

The invention relates generally to rotating magnetic storage disk drive and, more particularly, to a method of seamlessly recording circumferentially overlapping servo bursts on a magnetic disk with successive passes of a write head that is guided by a servo track writer wherein the servo bursts are contained in at least two servo burst groups that each have at least one circumferential burst position which may contain a servo burst. The method comprises the steps of turning a write current ON while passing the write head over a current ramp region that does not contain servo data and is located in front of an "active" servo burst group that will be modified on this pass, modifying a servo burst in at least one circumferential position of the active servo burst group with the write current ON; turning the write current OFF while passing the write head over a current ramp region that does not contain servo data and is located in front of a "passive" servo burst group that will not be modified on this pass; and skipping over at least one circumferential burst position of the passive servo burst group with the write current OFF.

24 Claims, 9 Drawing Sheets

PATTERN CONFIGURATION

| DATA TRACK # | STW PASS # | PRE-BURST 70 FIELD | BURST FIELD 91 | | | | POST BURST | DATA AREA |
|---|---|---|---|---|---|---|---|---|
| | | | 82 { A | B | C | 92 { D | | |
| | 0 | | A | | | | | |
| 0 | 1 | 1 | | | | | | |
| 0 | 2 | 1 | | B | | | | |
| 1 | 3 | 10 | A | | | | | |
| 1 | 4 | 10 | | | C | | | |
| | 5 | 11 | | B | | | | |
| 2 | 6 | 11 | A | | | D | | |
| 2 | 7 | 100 | | | C | | | |
| | 8 | 100 | | B | | | | |
| 3 | 9 | 101 | A | | | D | | |
| 3 | 10 | | | | C | | | |
| | 11 | | | | | D | | |
| | 12 | | | | | | | |

FUNCTIONAL WRITE CONTROL SEQUENCE

| DATA TRACK # | STW PASS # | PRE-BURST 70 FIELD 81 | BURST FIELD 82 A | BURST FIELD 82 B | BURST FIELD 91 C | BURST FIELD 92 D | POST BURST | DATA AREA |
|---|---|---|---|---|---|---|---|---|
| 0 | 0 | WRITE | ERASE | WRITE | ERASE | WRITE | WRITE | |
| 0 | 1 | WRITE | ERASE | ERASE | OFF | OFF | OFF | |
| 0 | 2 | OFF | OFF | OFF | WRITE | ERASE | WRITE | |
| 1 | 3 | WRITE | ERASE | WRITE | ERASE | OFF | OFF | |
| 1 | 4 | WRITE | OFF | OFF | OFF | WRITE | WRITE | |
| 1 | 5 | OFF | ERASE | ERASE | OFF | OFF | OFF | |
| 2 | 6 | WRITE | OFF | OFF | WRITE | ERASE | WRITE | |
| 2 | 7 | WRITE | WRITE | OFF | ERASE | OFF | OFF | |
| 2 | 8 | OFF | ERASE | ERASE | OFF | WRITE | WRITE | |
| 3 | 9 | WRITE | ERASE | WRITE | OFF | OFF | OFF | |
| 3 | 10 | WRITE | WRITE | ERASE | OFF | ERASE | WRITE | |
| 3 | 11 | OFF | ERASE | OFF | ERASE | OFF | OFF | |
| | 12 | WRITE | OFF | OFF | ERASE | WRITE | WRITE | |

METHOD OF SEAMLESSLY RECORDING CIRCUMFERENTIALLY SUCCESSIVE SERVO BURSTS THAT OVERLAP ONE ANOTHER

BACKGROUND OF THE INVENTION

1. Field of the Invention

The present invention relates generally to a rotating magnetic disk drive (disk drive), and more particularly to a method of seamlessly recording circumferentially successive servo bursts that overlap one another for providing servo information with an enhanced signal-to-noise ratio (SNR).

2. Description of the Related Art

A conventional disk drive has a head disk assembly ("HDA") including at least one magnetic disk ("disk"), a spindle motor for rapidly rotating the disk, and a head stack assembly ("HSA") that includes a transducer head for reading and writing data. The transducer head is controllably positioned by a servo system in order to read or write information from or to particular tracks on the disk. The typical HSA has two primary portions: (1) an actuator assembly that moves in response to the servo control system and (2) a head gimbal assembly ("HGA") that extends from the actuator assembly and biases the head toward the disk. The typical HSA further includes a flex circuit on the side of the actuator body and electrical conductors which run between the flex circuit and the head to transmit read and write signals to and from the head.

The industry presently prefers a "rotary" or "swing-type" actuator assembly which conventionally comprises an actuator body that rotates on a pivot assembly between limited positions, a coil that extends from one side of the actuator body to interact with permanent magnets to form a voice coil motor, and an actuator arm that extends from the opposite side of the actuator body to support the HGA.

Each surface of each disk conventionally contains a plurality of concentric tracks, each track comprising a plurality of servo data segments and user data segments. The servo data and user data of adjacent concentric tracks are radially aligned to form a plurality of sectors containing servo wedges and corresponding data wedges. The servo data comprises track ID fields and servo bursts (an alternating pattern of magnetic transitions) which are used by the servo system to align the transducer head with a particular data track. The servo control system moves the transducer head toward a desired track during a coarse position or "seek" mode based on the track ID field. Once the transducer head is over the desired track, the servo control system enters a fine position or "track follow" mode and uses the servo bursts to keep the transducer head over the data.

For many years, the industry has used inductive heads where the same transducer is used for reading and writing. More recently, however, the industry has begun using magnetoresistive transducers which are only capable of reading. Therefore, two separate heads are required—an inductive head for writing and a magnetoresistive head for reading. The separate read and write heads are necessarily spaced from one another—usually one behind the other. A variable skew between the two heads is introduced by this spacing due to the tangential relationship of the transducers to a circular data track on the disk as they are positioned over the disk from inner to outer tracks. The relative positions of the two heads may be set during the manufacturing process to bias the skew so that the heads may be, for example, aligned when positioned over the innermost tracks and skewed when positioned over the outermost tracks or other arrangements suitable for a particular design objective. Manufacturing tolerances can also cause a small shift in the relative centerlines of the heads with respect to one another.

A problem exists with using the magnetoresistive transducer head, therefore, because the servo bursts are read with the magnetoresistive read head but the data tracks are written with the inductive write head that is variably skewed from the read head depending on the radial position over the disk. As a result of this physical displacement between the two heads, it is necessary to offset or "microjog" the transducer head during the read operation or during the write operation.

The servo electronics convert the amplitude of each burst to an electrical signal to generate a position error signal (PES) that a microprocessor uses to determine the required control effort or correction needed to track follow. In this disclosure, the equal signal center line of a burst pair is called a "burst pair centerline." The servo control system usually aligns the read head with a burst pair centerline while writing, so that the centerline of the data track is displaced from the burst pair centerline by the physical displacement between the read and write heads at that particular radius. Later, in order to maximize the signal amplitude and the signal-to-noise ratio when reading the data, the servo control system micro-jogs the read head away from the burst pair centerline in the same direction as the original physical displacement so that the read head passes over the center line of the data track while track following.

A continuing problem is that the magnetoresistive read head is relatively narrow and has a limited range of linearity. In other words, as the read head is displaced from the burst pair centerline, there is a relatively small amount of displacement over which the signal produced by the servo bursts remains linearly related. In the inventors' experience, the magnetoresistive read head can be conventionally displaced from the burst pair centerline by about ⅙ of a track pitch (the distance between centerlines of adjacent tracks) and still remain within a useable range of linearity.

One potential approach to resolving the narrow range of linearity of the magnetoresistive read head is providing additional burst pair centerlines within a data track pitch so that the read head is always within its linear width of at least one of the burst pair centerlines. In a conventional four burst servo pattern comprising full data track width (100%) servo bursts forming A/B burst pairs and C/D burst pairs that are arranged in "quadrature" to one another, there are two burst pair centerlines per data track pitch. The burst pair centerlines occur, therefore, at one-half track intervals. Since the magnetoresistive read transducer cannot be micro-jogged more than 25% of a data track pitch and remain within its linear range, it may be desirable to provide more than two burst pair centerlines per data track pitch by adding more servo bursts in a circumferential dimension or in a radial dimension. If we wanted three burst pair centerlines per data track pitch, for example, we could add more servo bursts in the circumferential dimension by adding another burst pair, e.g. an E/F burst pair, and then position the burst pair centerlines of the A/B pair, the C/D pair, and the E/F pair at ⅓ data track pitch offsets. However, an additional servo burst pair in the circumferential dimension takes up valuable space that could otherwise be occupied by data. It is desirable, therefore, to increase the number of servo bursts in the radial direction rather than the circumferential direction without restricting the number of data tracks on a surface. We can accomplish this by using only two burst pairs where each burst is sufficiently narrow so that three burst pair centerlines occur within each data track pitch.

A device called a servo track writer or "servowriter" is generally used to record the servo bursts and other servo information. The servowriter is basically a jig that mechanically moves the heads to a desired radial position and then causes a portion of the servo information to be recorded for that position. The servowriting process conventionally records a plurality of servo sectors by writing track identification data and servo bursts at discrete intervals around the track circumference. The servowriter then steps the headstack position by a fraction of a track pitch, and then may write new bursts and overwrite or erase a portion of previously written bursts. Overwriting a portion of a burst serves to extend its width, while erasing a portion of a burst "trims" the burst to a desired width. Each stepping of the headstack and subsequent writing of bursts or erasures is commonly termed a "pass" of the servowriter. Since the stepping is significantly less than the burst width, the bursts written during a current pass may be said to "overlap" bursts from a previous pass.

In a conventional servo writing process, the write current is always turned ON when a servo sector is passing under the head such that the write head is either writing (recording magnetic transitions) or erasing (the current being held in a steady state direction). When a given servo burst is overwritten after stepping, this always ON condition of the write current inherently causes the servo burst to be "stitched" together in two write passes and then it must conventionally be trimmed in a third erase pass. Servo bursts recorded with two write passes have a central artifact that is caused by erase bands created at the outer edges of the write head. These bands form a "seam" where the burst is stitched together. This seam, sometimes called "hooks" or "transition hooks" contributes noise during the reading of servo bursts. This noise, occurring during the reading of servo burst signals, is deleterious to an important measure of quality in servo processing—the Signal-to-Noise Ratio or SNR. The effects of the noise are more pronounced in the case of MR heads because of the non-linear response characteristic of the heads. Also, hooks are a relatively minor problem when servo burst widths are 100% of a data track because they occupy a relatively small percentage of the burst portion being read (conventionally 50% of a track pitch) and, moreover, because the hooks are so far from the burst pair centerline that a major portion of the read head would generally not pass over the hooks in a track follow mode. With the narrower bursts often used with MR heads, the hooks are more significant.

Another artifact of the stitched servo burst is a slight phase offset between the stitched portions of the burst. This phase offset, termed "shingling", can contribute errors in processing servo burst amplitudes where the transitions within a burst are integrated to define a burst amplitude.

Given the above disadvantages of creating servo burst patterns which are stitched together to form seams and the need to provide servo burst patterns which are compatible with MR heads there is a clear need to provide to provide a unique method of seamlessly recording servo bursts that circumferentially overlap one another without creating hooks or shingling effects.

SUMMARY OF INVENTION

The invention comprises a method of seamlessly recording circumferentially successive overlapping servo bursts on a magnetic disk with successive passes of a write head that is guided by a servo track writer wherein the servo bursts are contained in at least two servo burst groups that each have at least one circumferential burst position which may contain a servo burst having a circumferential projection that radially overlaps a servo burst in another servo burst group. The method further comprises the step, during each pass of the write head, of turning a write current on while passing the write head over a current ramp region that does not contain servo data and precedes an active servo burst group that will be modified on this pass, the write current reaching a desired maximum value within the current ramp region before the write head reaches the active servo burst group. The method further comprises the steps of modifying a servo burst in at least one circumferential position of the active servo burst group with the write current on, turning the write current off while passing the write head over a current ramp region that does not contain servo data precedes a passive servo burst group that will not be modified on this pass, the write current reaching a desired minimum value within the current ramp region before the write head reaches the passive servo burst group. The method still further comprises the step of skipping over the at least one circumferential burst position of the passive servo burst group with the write current off. Preferably, the step of modifying a servo burst comprises writing a servo burst or may comprise trimming a servo burst.

The invention may alternatively be characterized as a method of seamlessly recording a servo pattern of four servo bursts on a magnetic disk using successive passes of a write head that is guided by a servo track writer wherein each servo burst is written as an oversized servo burst with a width corresponding to a width of the write head and then trimmed to a finished width that is less than the width of the write head. The method comprises the steps of offsetting the write head by a predetermined fraction of a data track pitch on successive passes of the write head wherein the write head will necessarily pass over a previously written, oversized servo burst while writing a new burst and trimming another previously written burst; passing the write head over a first circumferential burst position while sequentially writing, skipping, trimming, and skipping, respectively, on four successive passes; passing the write head over a second circumferential burst position while sequentially trimming, skipping, writing, and skipping respectively, on four successive passes; passing the write head over a third circumferential burst position while sequentially skipping, trimming, skipping, and writing respectively, on four successive passes; passing the write head over a fourth circumferential burst position while sequentially skipping, writing, skipping and trimming respectively, on four successive passes; turning a write current ON while passing the write head over a current ramp region that does not contain servo data before writing and trimming; and turning the write current OFF while passing the write head over a current ramp region that does not contain servo data before skipping.

In another alternative, the invention may be considered a method of recording a servo pattern on a magnetic disk using a servo track writer wherein each new burst overlaps an existing burst, the method comprising the steps of: providing a write current to a write head; writing a new servo burst by modulating a polarity of the write current; removing the write current from the write head after writing the new servo burst; permitting the write current to decay to a desired minimum value while passing the write head over a current ramp region that does not contain servo data; and passing the write head over an existing servo burst that was written on a previous pass of the write head without stitching further servo information onto the existing servo burst; whereby each servo burst may be written as a seamless burst with a single pass of the write head.

In yet another alternative, the invention may be considered as a method of seamlessly recording a servo pattern of four servo bursts on a magnetic disk using a write head that is guided by a servo track writer wherein each servo burst is written oversized and then trimmed to a width that is less than a width of the write head, the method comprising the steps of: offsetting the write head by a fraction of a data track pitch; turning a write current ON while passing the write head over a current ramp region that does not contain servo data; writing a new, oversized servo burst at a first circumferential burst position with the write current ON; trimming a previously written, oversized servo burst at a second circumferential burst position with the write current ON; turning the write current OFF while passing the write head over a current ramp region that does not contain servo data; passing the write head over a third circumferential burst position containing a previously written, oversized servo burst with the write current OFF; and passing the write head over a fourth circumferential burst position with the write current OFF.

BRIEF DESCRIPTION OF THE DRAWINGS

The just summarized invention may best be understood with reference to the Figures of which.

BRIEF DESCRIPTION OF THE PREFERRED EMBODIMENTS

Figure 1:
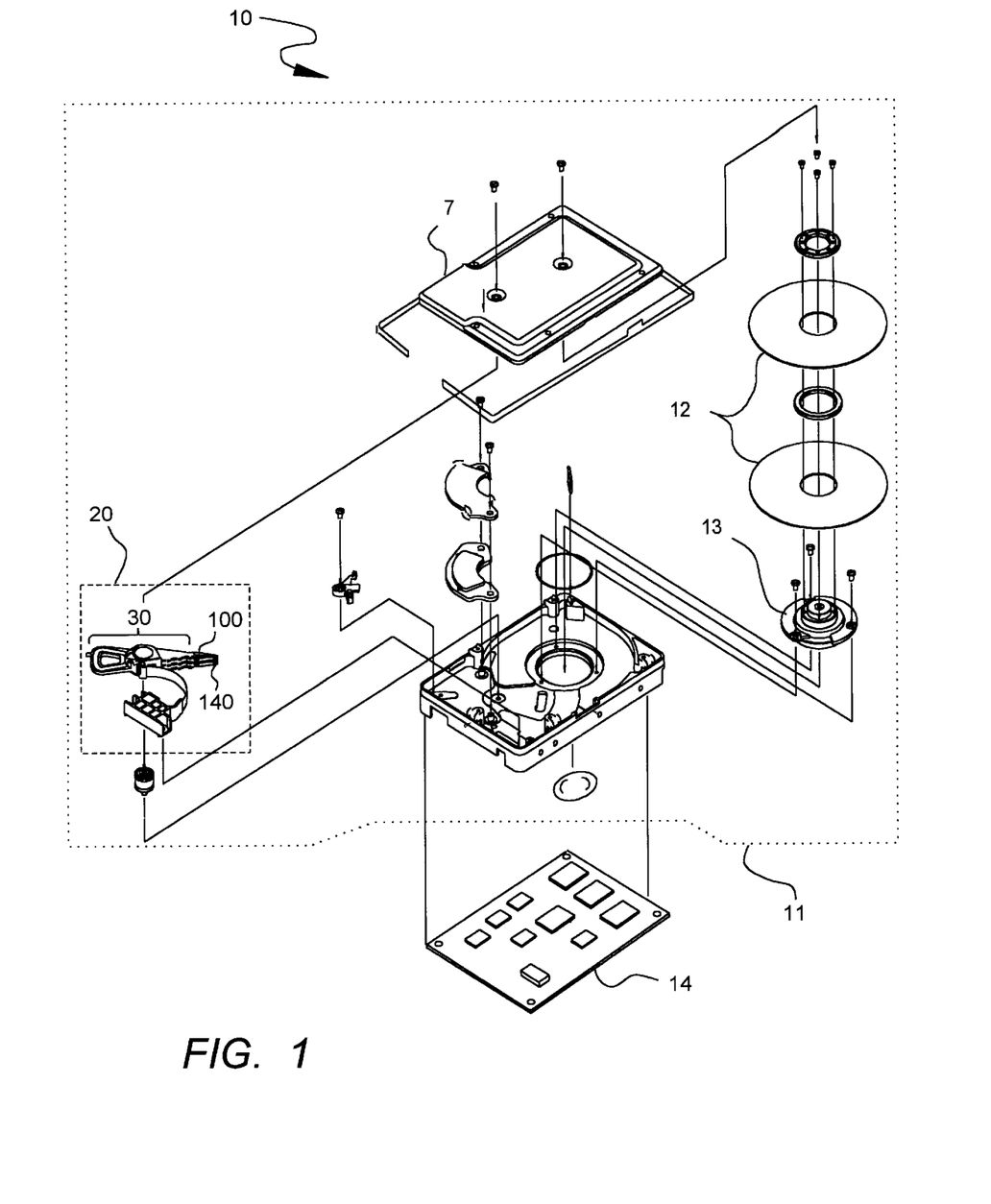
FIG. 1 is an exploded perspective view of a magnetic disk drive 10 having a head disk assembly 11 ("HDA") including a head stack assembly 20 ("HSA") which carries a transducer 140 over concentric data tracks and associated servo bursts on the surface of a disk 12.

FIG. 1 shows the principal components of a disk drive 10 which operates with a servo burst pattern written according to the method of the present invention. The disk drive 10 shown is an integrated drive electronics (IDE) drive, comprising a head disk assembly (HDA) 11 and a controller circuit board 14.

The HDA 11 of FIG. 1 comprises a magnetic disk 12 (2 shown), a spindle motor 13 for rapidly rotating the disk 12 (2 shown), and a head stack assembly 20 located next to the disk 12. The head stack assembly 20 shown comprises a swing-type actuator assembly 30 which has at least one head gimbal assembly 100 that carries a transducer 140. The transducer 140 generally comprises an inductive write head and a magnetoresistive (MR) read head although other head technologies may be used.

The disk drive industry has commonly recorded servo information on at least one surface of at least one of the disks 12 for use in positioning a head for reading or writing data. The early drives used a "dedicated servo system" wherein one head and one disk surface provided the servo information for all of the other heads and disk surfaces. The industry presently prefers "embedded servo" wherein the servo information is interspersed with the data on each surface of each disk. The data is conventionally contained in concentric tracks and, in an embedded servo environment, each track is divided into a plurality of sectors which contain servo information followed by data sectors. Because of this arrangement, an embedded servo system is sometimes called a sector servo system. Other track arrangements for servo and data sectors may be used, including tracks which describe a spiral path rather than strictly concentric.

The most basic servo burst pattern might be viewed as comprising two 100% (of a track pitch) servo bursts A, B. Such a pattern would provide a single burst pair centerline that coincides with and defines each data track centerline. Of relevance to the present invention, a 100% servo burst must be assembled with more than one write pass because a 100% burst is wider than a write head which is typically 80%–90% of a track pitch. In fact, the conventional method of writing a 100% burst comprises a first write pass, a second write pass, and a trim pass.

An inherent problem with the basic A/B burst pattern is that there are blind spots when reading the bursts with a read head which is narrower than the burst in other words, there are positions at which the head may be at a plurality of positions over the burst without corresponding amplitude variations being sensed. This phenomenon causes uncertainty as to the position of the head and requires additional time for seeking and settling.

The industry subsequently developed a four burst pattern that eliminated such blind spots. This pattern provides two burst pair centerlines per track pitch using four sequential 100% bursts A, B, C, and D that are written in 50% offsets. Here again, however, it was necessary to assemble the 100% bursts with multiple write passes of the 80% head. Each burst, therefore, is "stitched" together near its center. This stitching can create the aforementioned undesirable effects of degraded signal-to-noise ration (SNR) and amplitude integration errors.

It has more recently become desirable to make the servo burst width less than the width of the write head. For example, a magnetoresistive read head can only be conventionally moved about ⅙ of a track pitch from a burst pair centerline and remain within a useable linear range. In order to micro-jog the magnetoresistive read head farther than otherwise possible from a given burst pair centerline, therefore, it has been proposed that there be more than two burst pair centerlines per track. One way of adding more burst pair centerlines is adding more circumferential servo burst positions and more servo bursts. This takes up valuable data space. A more desirable way of providing additional burst pair centerlines, therefore, is to reduce the width of the individual servo bursts to less than 100% so that the servo track pitch is less than the data track pitch.

Figure 5:
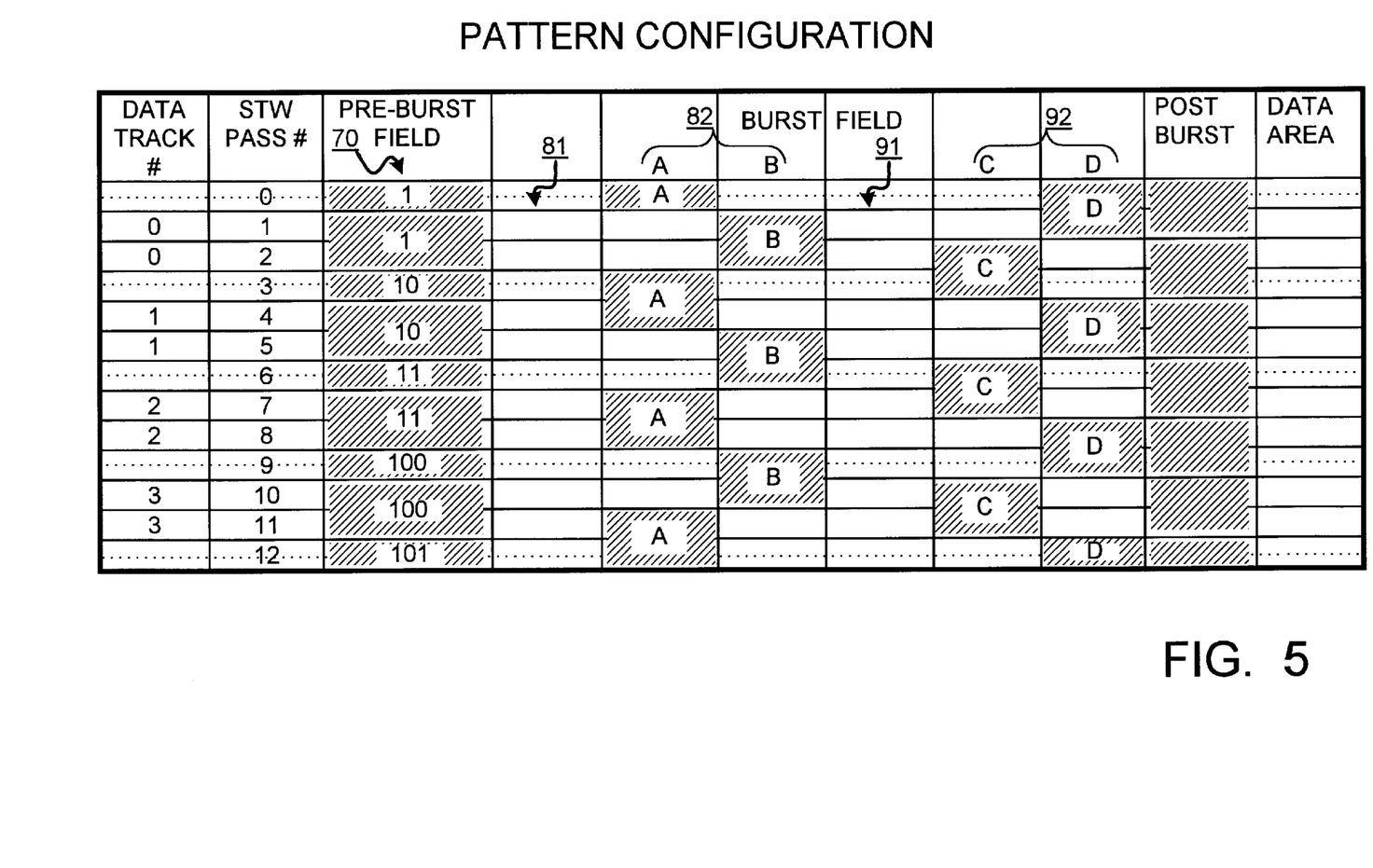
FIG. 5 is a schematic diagram of a preferred servo burst configuration written according to the method of the present invention wherein each burst is two-thirds of a data track pitch in width and written by moving the write head in one-third track pitch offsets to provide three burst pair centerlines per data track.

As shown in FIG. 5, the servo information generally comprises a pre-burst track ID field 70 which uniquely identifies each track for coarsely moving the head to a desired track ("seeking"), and a plurality of circumferentially sequential, radially offset servo bursts (e.g. A, B, C, and D) for keeping the head at a desired position relative to track center ("track following"). This patent application is directed to an innovative method of recording a pattern of such servo bursts. It should be understood, therefore, that FIG. 5 presents one example of such a pattern.

FIG. 5 provides a schematic diagram of a preferred servo burst pattern written according to the method of the present invention wherein each burst is ⅔ of a data track pitch in width and is written by moving the write head in ⅓ track pitch offsets to provide three burst pair centerlines per data track. The servo burst pattern of FIG. 5 may be written across an entire disk surface by initially completing passes 0 through 12, and then repeating passes 1 through 12 as needed. The left-most column labeled "DATA TRACK#" indicates the data track associated with a corresponding pass of the servowriter. The next column "STW PASS#" indicates the sequentially numbered servowriter pass. The PRE-BURST FIELD 70 column indicates a relative track identification code field for a data track. The BURST FIELD columns indicate relative circumferential positions within the servo sector. Blank columns 81 and 91 provide current ramp fields described below. Bursts A, B, C and D are shown in their relative circumferential (along the length of a track) and radial (disposition across the disk surface from inner to outer diameter) positions. The labeling of bursts A,B,C and D in this example is only intended to indicate their order of occurrence. Other arbitrary designations for bursts may be used.

Figure 6:
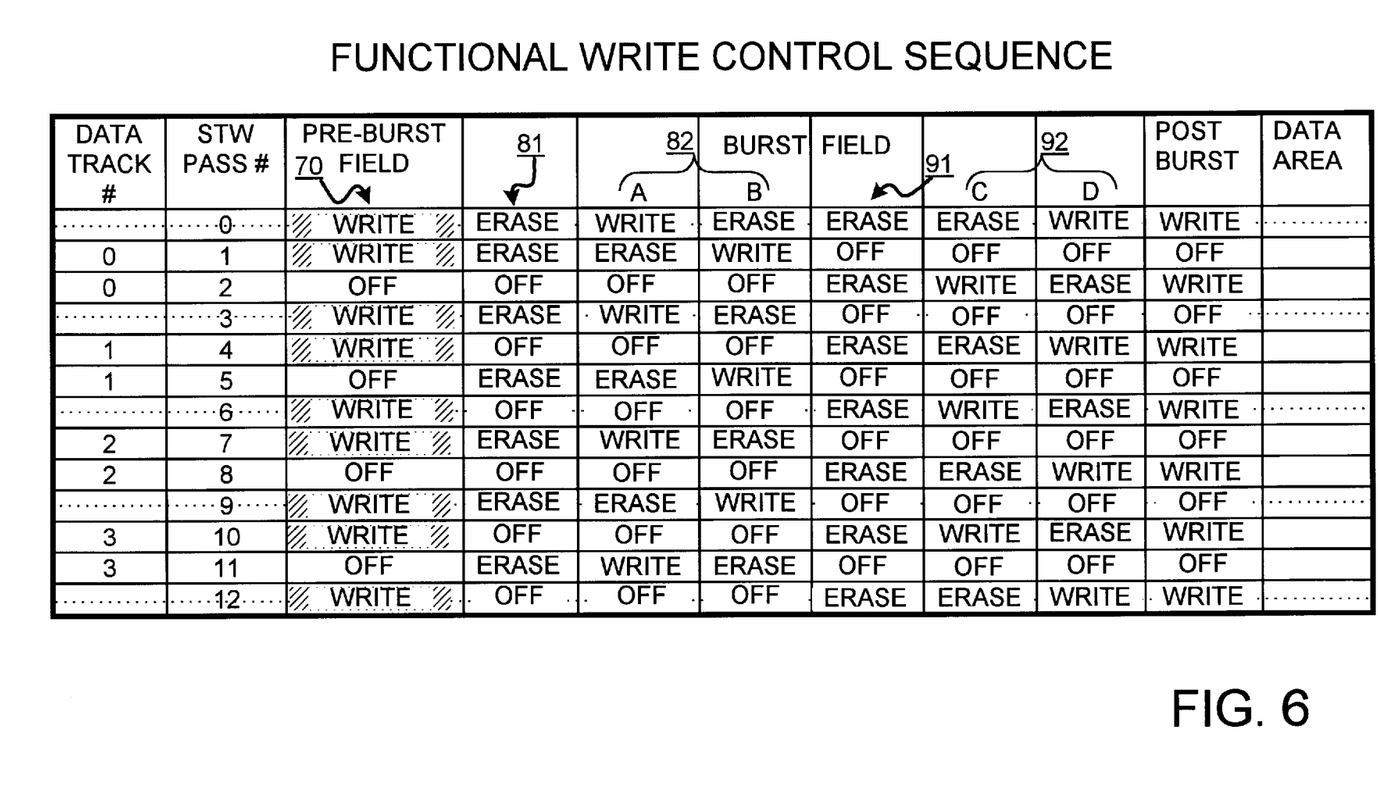
FIG. 6 is a schematic diagram of the functional write control sequence used to record the servo burst configuration of FIG. 5.

FIG. 6 is a schematic diagram of the functional write control sequence used to record the servo burst configuration of FIG. 5. As shown therein, the write current is controlled in one of three states: Erase, Write, or OFF. The Write and Erase states are species of an ON state, the current being modulated to effect magnetic transitions on the disk in the Write state and being held in a static condition in the Erase state. As shown in FIG. 6, and explained further below with reference to FIGS. 3A–3F, the write current may be turned OFF in a current ramp region 81, 91 before reaching servo burst positions in a servo burst group 82, 92, in order to skip harmlessly over the burst positions in that group.

FIGS. 2A–2F show the steps of recording servo bursts using a conventional servo writing method. This servo pattern is called a ⅓-⅓-⅓ pattern because the servowriter steps through three passes of ⅓ of a track pitch to write the pattern. The individual bursts have a width of ⅔ of a track pitch. The ⅓ offset provides the desired three burst pair centerlines for every track pitch. The ⅔ wide bursts provide the burst pair centerlines using only four burst positions A, B, C, and D rather than six burst positions A, B, C, D, E and F.

The conventional servo writing method is characterized by an "always ON" condition of the write current. This always ON condition is suggested in FIGS. 2A–2F by the cross hatched areas, the diagonal hatching indicating that the current is ON but not being modulated (erasing), and the vertically hatched areas indicating that the current is being modulated to record magnetic transitions associated with a servo burst (writing). As explained further below, the conventional servo writing method leaves a region of undesirable erase band hooks 18 in the middle of each ⅔ burst A, B, C, and D that reduces the SNR achievable while reading each burst and additionally produces the aforementioned shingling effects.

Figure 2A:
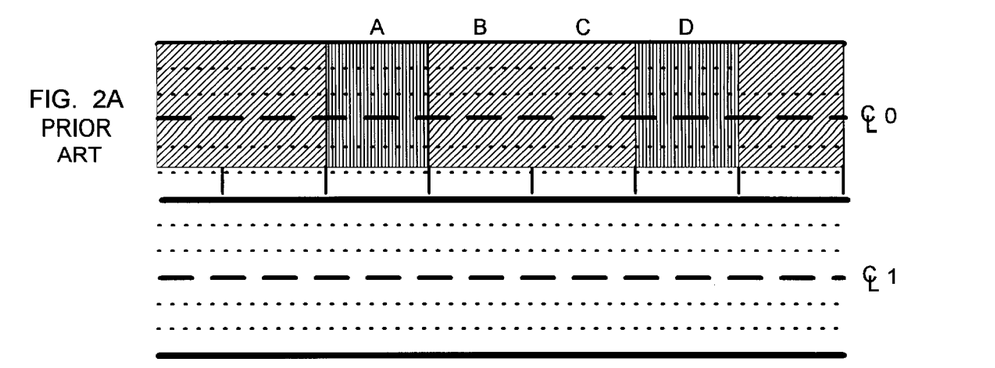
FIGS. 2A–2F are schematic drawings sequentially illustrating the prior art method of recording four servo bursts wherein the write current is always ON and wherein each burst is recorded with two write passes and one erase pass which results in each burst being stitched together with an erase band seam or "hooks" along a central portion thereof.

The conventional servo writing method proceeds as follows. In FIGS. 2A–2F, the write current is continuously ON as the write head (not shown) writes servo information from left to right of the figures on each pass. The head in FIGS. 2A–2F moves sequentially from top to bottom of the figures under the control of the servowriter. Although in actuality the burst positions pass under the head as the disk rotates, it may be useful for illustration purposes to speak of the head passing over each position. As shown in FIG. 2A, therefore, the write current is already ON and the head is erasing as it approaches burst positions A, B, C, and D. The initial pass 0 of FIG. 2A is unlike subsequent passes because the initial A burst will be placed near an outside edge of the disk 12. On the initial pass of FIG. 2A, the head is writing at position A, erasing at positions B and C, and writing at position D while the current is always ON.

Figure 2B:
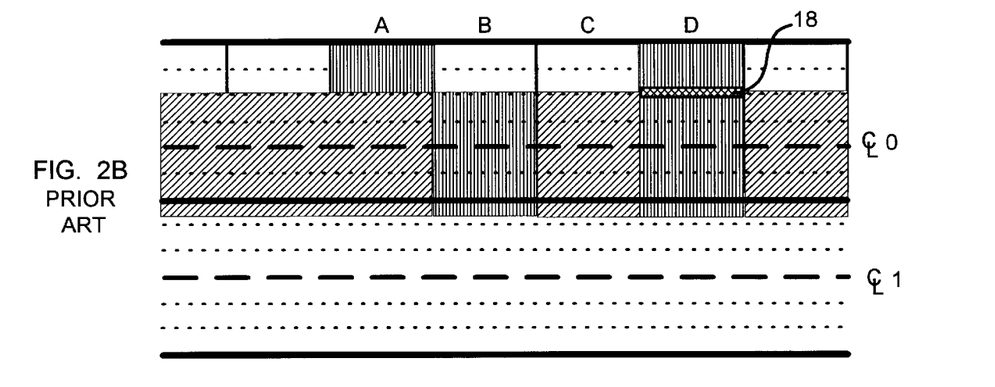

In FIG. 2B, the head has been displaced by ⅓ of a track pitch for pass 1. Now, as the head passes from left to right, it is erasing at position A, trimming burst A to its final ⅓ width; writing at position B; erasing at position C; and writing at position D, thereby stitching more transitions onto burst D and creating the undesirable erase band region 18.

Figure 2C:
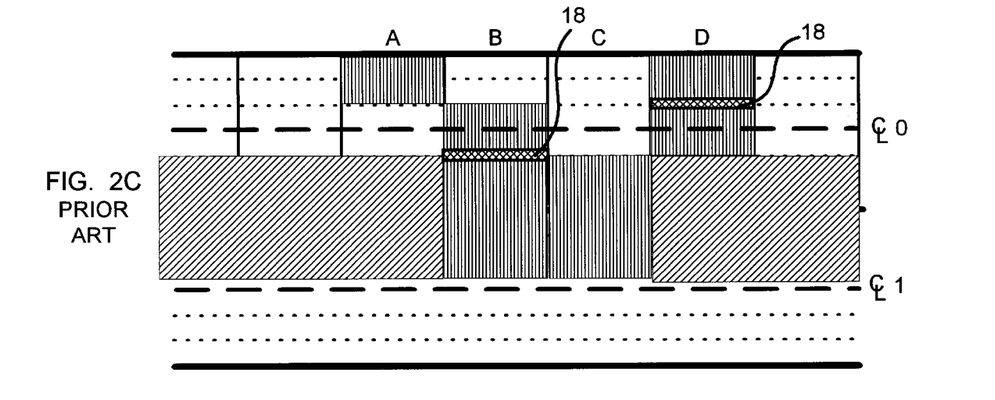
Figure 2D:
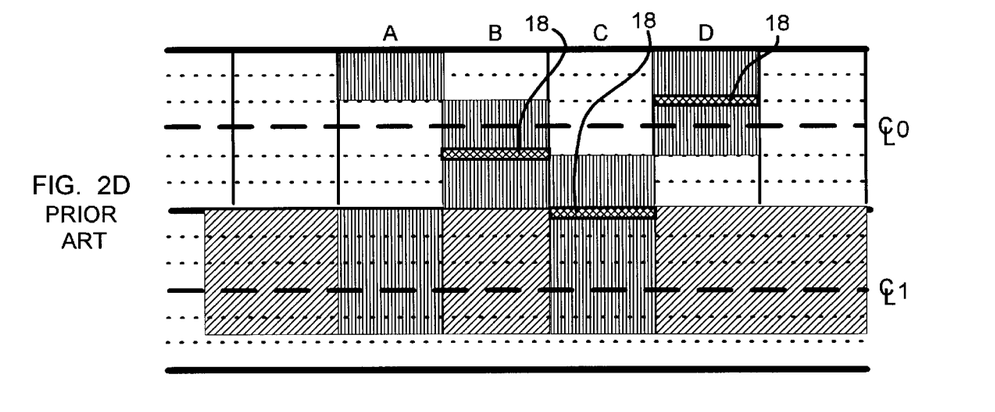
Figure 2E:
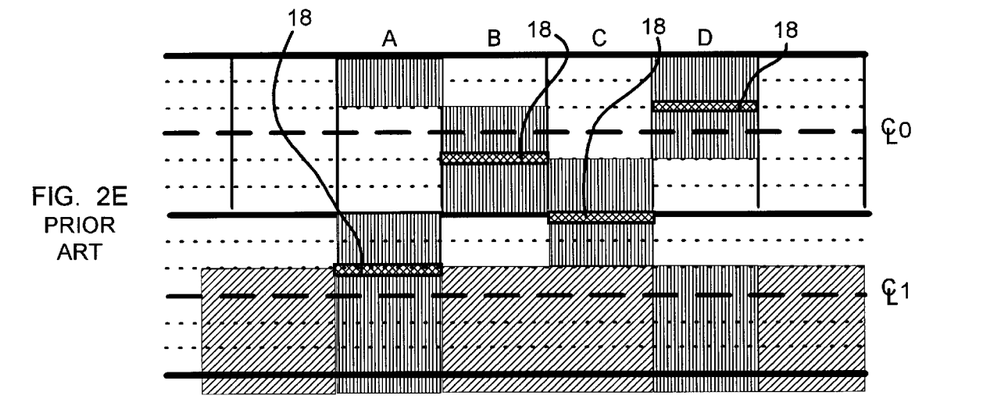
Figure 2F:
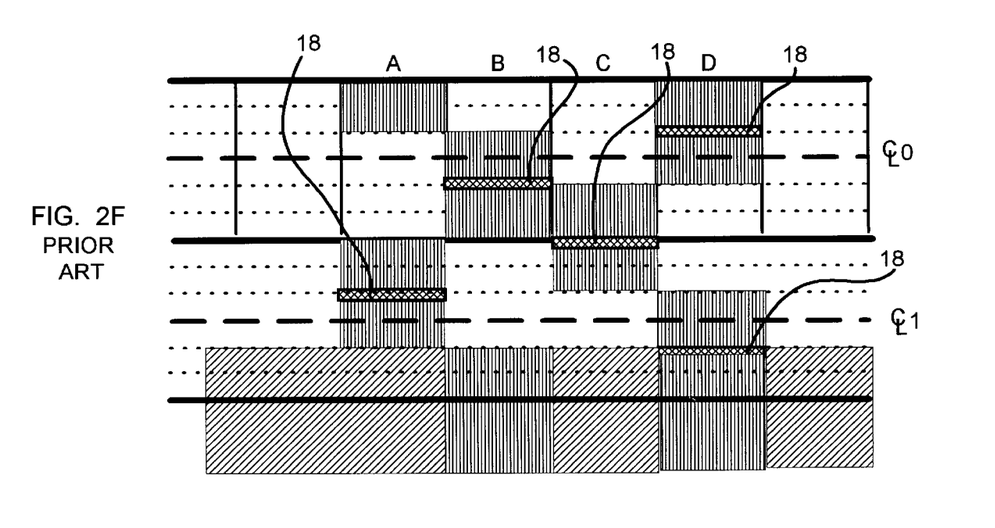

In FIG. 2C, the head has been displaced by another ⅓ of a track pitch for pass 2. Here, the head is erasing at position A; writing at position B, stitching more transitions onto burst B and creating another undesirable erase band region 18, erasing at position C; and erasing at position D, trimming burst D to its final ⅔ width. This process is systematically repeated, as suggested by FIGS. 2D–2F, to create the desired pattern. Unfortunately, however, each servo burst A, B, C, and D contains an erase band or hook region 18 near its center.

The present inventors have developed an innovative method of recording servo bursts wherein an X% head can record a sub-X% burst in one write pass and one trim pass without creating an erase band. The method is particularly advantageous for recording a servo pattern wherein the head necessarily passes over an "old" previously recorded burst while writing a top portion of a "new" burst, trimming the bottom portion of another "old" burst, or both. The inventors have, more particularly, developed an innovative method of recording servo bursts wherein the bursts are divided into servo burst groups that are each preceded by a current ramp region so that the current may be selectively turned ON and OFF for each group. On each pass, therefore, the current may be selectively turned ON to modify one servo burst group and turned OFF to skip harmlessly over another servo burst group. This unique recording method beneficially eliminates the stitched erase band regions 18.

FIGS. 3A–3F show the operation of the subject method using a nominal 80% write head (not shown) to record a ⅓-⅓-⅓ pattern like that shown in FIGS. 2A–2F. In FIGS. 3A–3F, however, the ⅔ wide sub-80% bursts are uniquely recorded in one write pass, one skip pass, and one trim pass without creating an erase band region 18. In this particular case, and in accordance with the servo writing method of the present invention, the four servo bursts A, B, C, and D are divided into first and second servo burst groups 82, 92 that are preceded respectively by first and second current ramp regions 81, 91. The first servo burst group 82 contains the A and B burst positions and the second servo burst group 92 contains the C and D burst positions. The A–D bursts are circumferentially successive and are located with respect to each other such that a portion of a burst in one group forms a projection which overlaps a burst in a prior group. Such a projection may be seen in FIG. 3D–3F where a portion of the C burst radially overlaps the position of the B Burst.

Figure 3A:
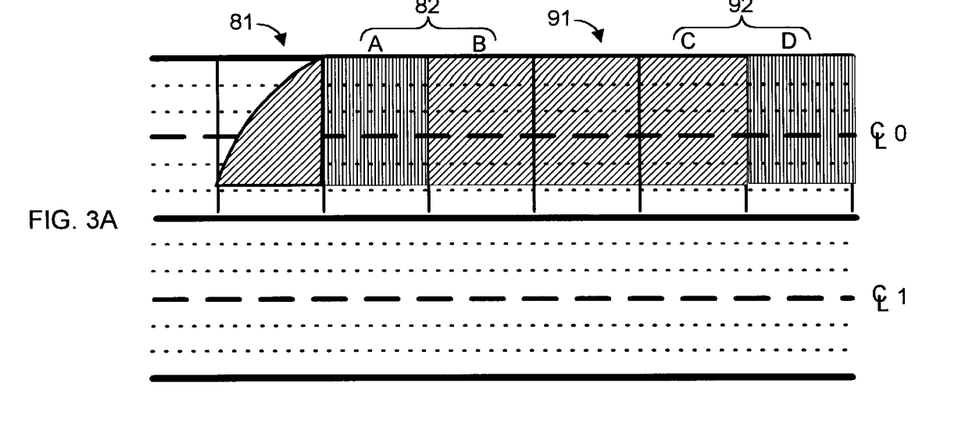
FIGS. 3A–3F are schematic drawings sequentially illustrating the present invention's method of recording four servo bursts wherein the bursts are arranged in burst groups preceded by current ramp regions and, wherein the write current is controllably turned ON and OFF during each pass, and wherein each burst is seamlessly written with one write pass, one skip pass, and one trim pass by modifying the servo bursts in one burst group with the current turned ON (i.e. written or trimmed) while skipping over the servo bursts in another burst group with the current turned OFF.

With continued references to FIGS. 3A–3F, the method proceeds as follows. FIG. 3A shows pass 0. As in FIG. 2A, discussed above, this first pass is unlike subsequent passes because the initial A burst will only be ⅓ wide in order to place the centerline CL0 of the first track as close as possible to the edge of the disk. On this pass, as suggested by the rising edge of the diagonally cross-hatched region, the current is turned ON in the first current ramp region 81 so that it rises to a desired maximum level before reaching the first servo burst group 82. As it continues to the right, the head is writing at position A, erasing at position B, erasing in the second current ramp region 91, erasing at position C, and writing at position D.

Figure 3B:
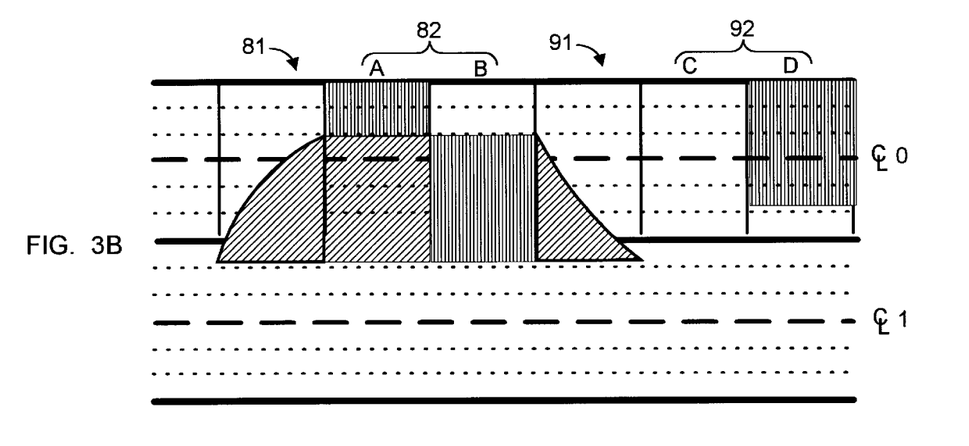

In FIG. 3B, the head has been displaced by ⅓ of a track pitch for pass 1. Now, as the head passes from left to right, the current is turning ON in the first current ramp region 81 so that it reaches a desired maximum value before modifying the burst positions A and B in the first servo burst group 82. More specifically, the head is erasing at position A, trimming the initial burst A to its final ⅓ width; and writing at position B. As the head continues moving, the current is turning OFF in the second current ramp region 91 and the head then "skips" over the burst positions C and D in the second burst group 92 without stitching more transitions onto burst D and creating an erase band region 18 as would occur in FIG. 2B.

Figure 3C:
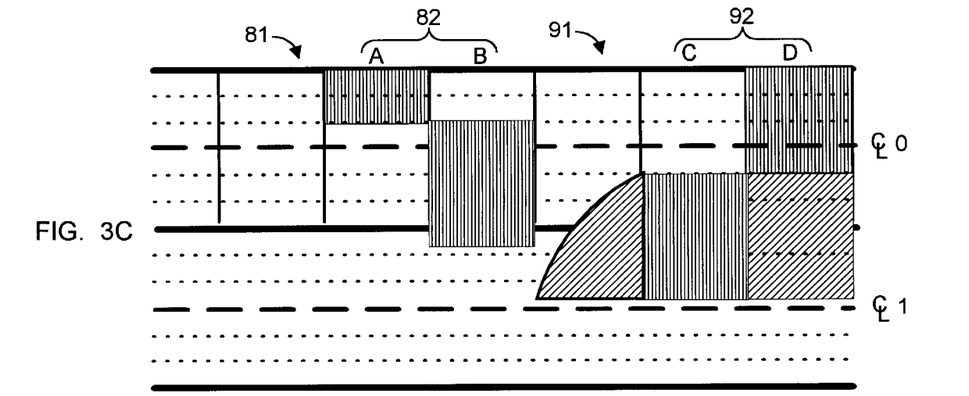
Figure 3D:
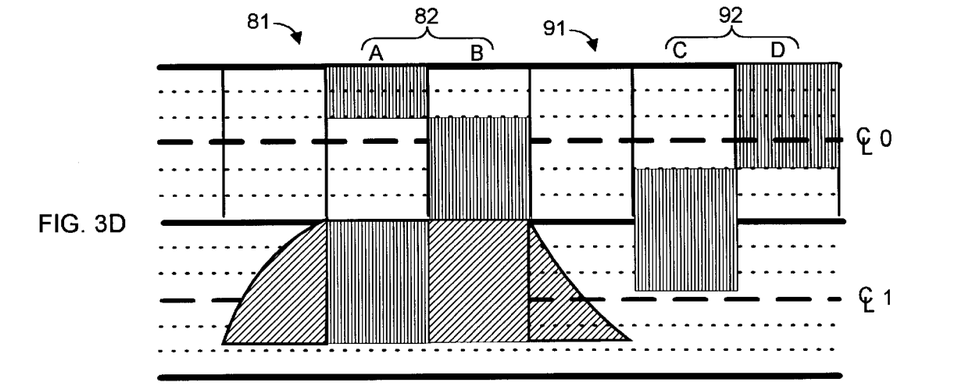
Figure 3E:
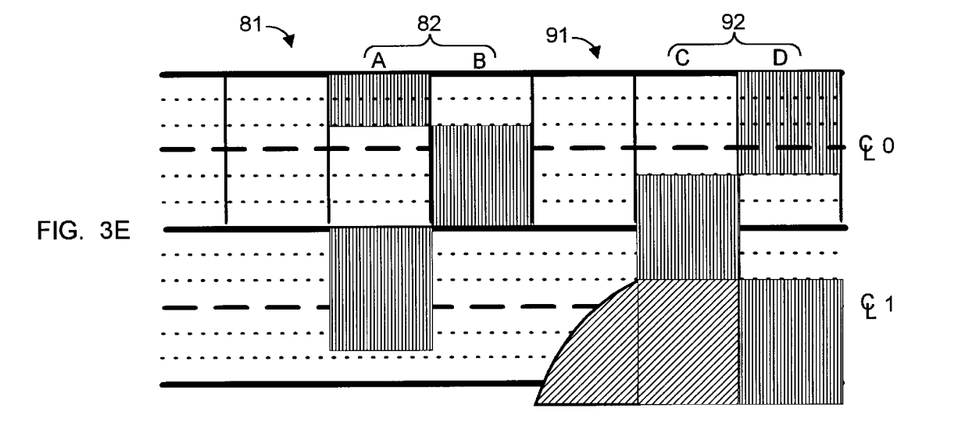
Figure 3F:
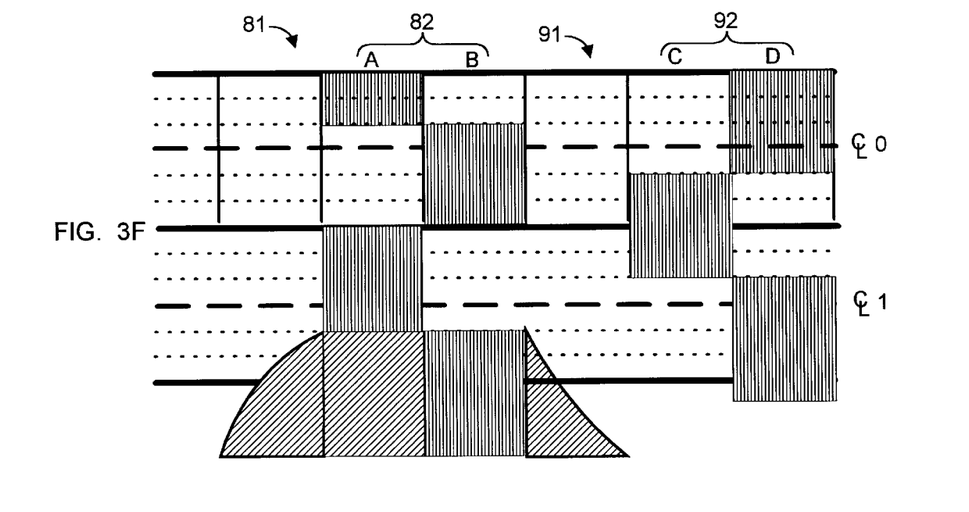

In FIG. 3C, the head has been displaced by another ⅓ of a track pitch for pass 2. Here, the current is OFF while the head is skipping over the first current ramp region 81, and burst positions A, and B in the first servo burst group 82. Comparing FIG. 3C with 2C, it can be seen that burst transitions are not undesirably stitched onto burst B. As the head continues moving, the current is turning ON in the second current ramp region 91 so that it reaches a desired maximum value before reaching the second servo burst group 92. The head is then writing at position C and erasing at position D, trimming burst D written on pass 0 to its final 2⅓ width. The subject servo writing method systematically continues as suggested by FIGS. 3D–3F in order to seamlessly record a ⅓-⅓-⅓ servo pattern without erase band regions 18.

Figure 4:
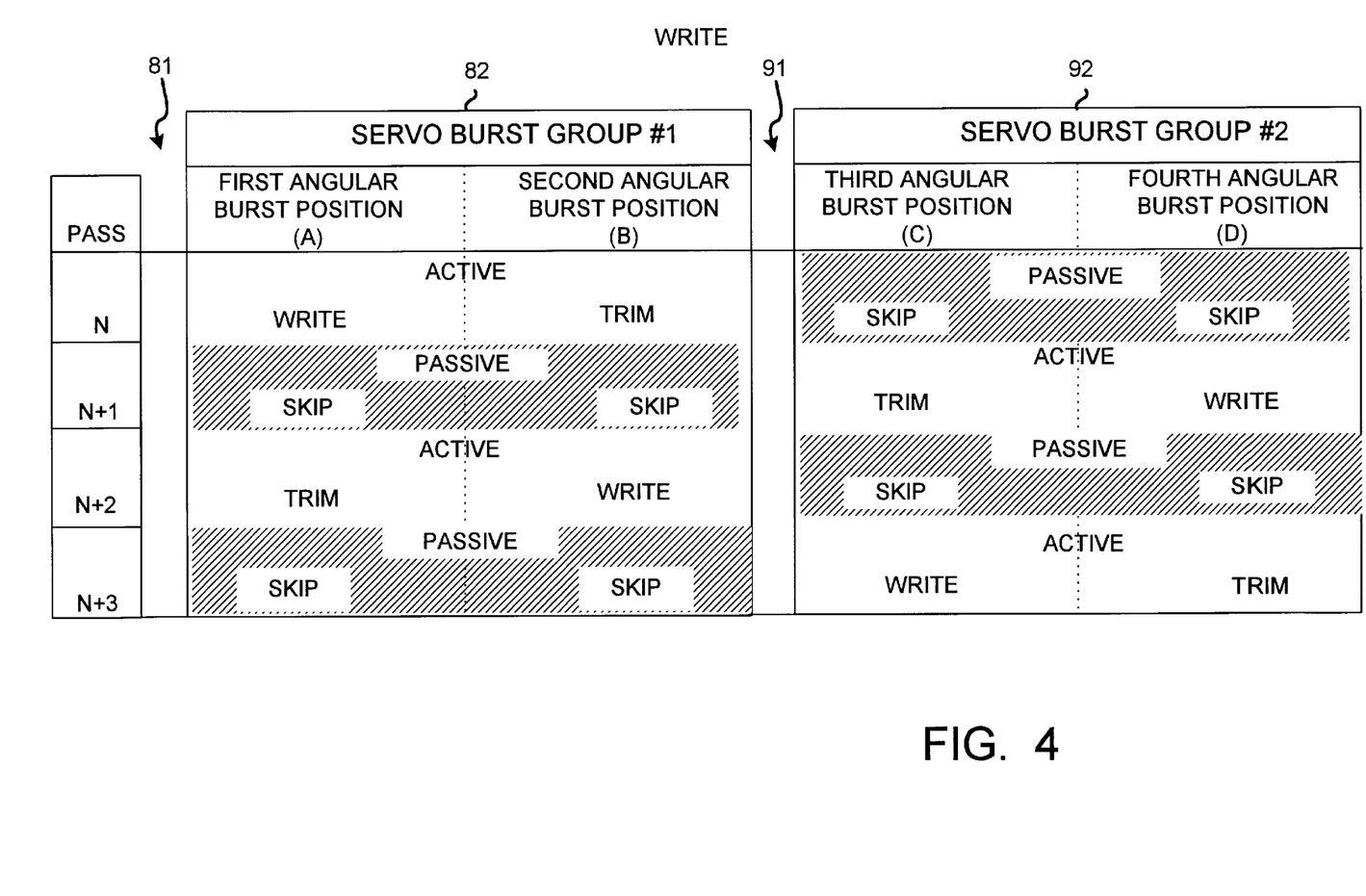
FIG. 4 is a table relating to FIGS. 3A–3F two burst groups showing that they are alternately "ACTIVE" or "PASSIVE" on successive write head passes (n, n+1, n+2, etc.) so that the bursts at circumferential positions within each burst group are alternately modified (written or trimmed) or skipped.

FIG. 4 generalizes the sequential steps of the servo writing method illustrated by FIGS. 3A–3F by defining the servo burst groups 82, 92 as either "ACTIVE" or "PASSIVE". As shown, the servo burst positions in an ACTIVE group are modified (either written or erased), whereas the servo burst positions in a PASSIVE group are completely skipped over. As a result of the present invention which turns the current ON and OFF in current ramp regions 81, 91 that precede each group 82, 92, one group may be ACTIVE and another PASSIVE on the same pass of the write head.

The present method has been described with respect to a servo burst pattern involving four circumferentially sequen-tial servo burst positions, A, B, C, and D, where the bursts are written in ⅓ track pitch offsets or increments and are each ⅔ of a track pitch in width. The servo writing method disclosed by these inventors could, of course, be used to produce a servo pattern having a different number of servo burst positions, different offsets, and different widths.

Figure 7:
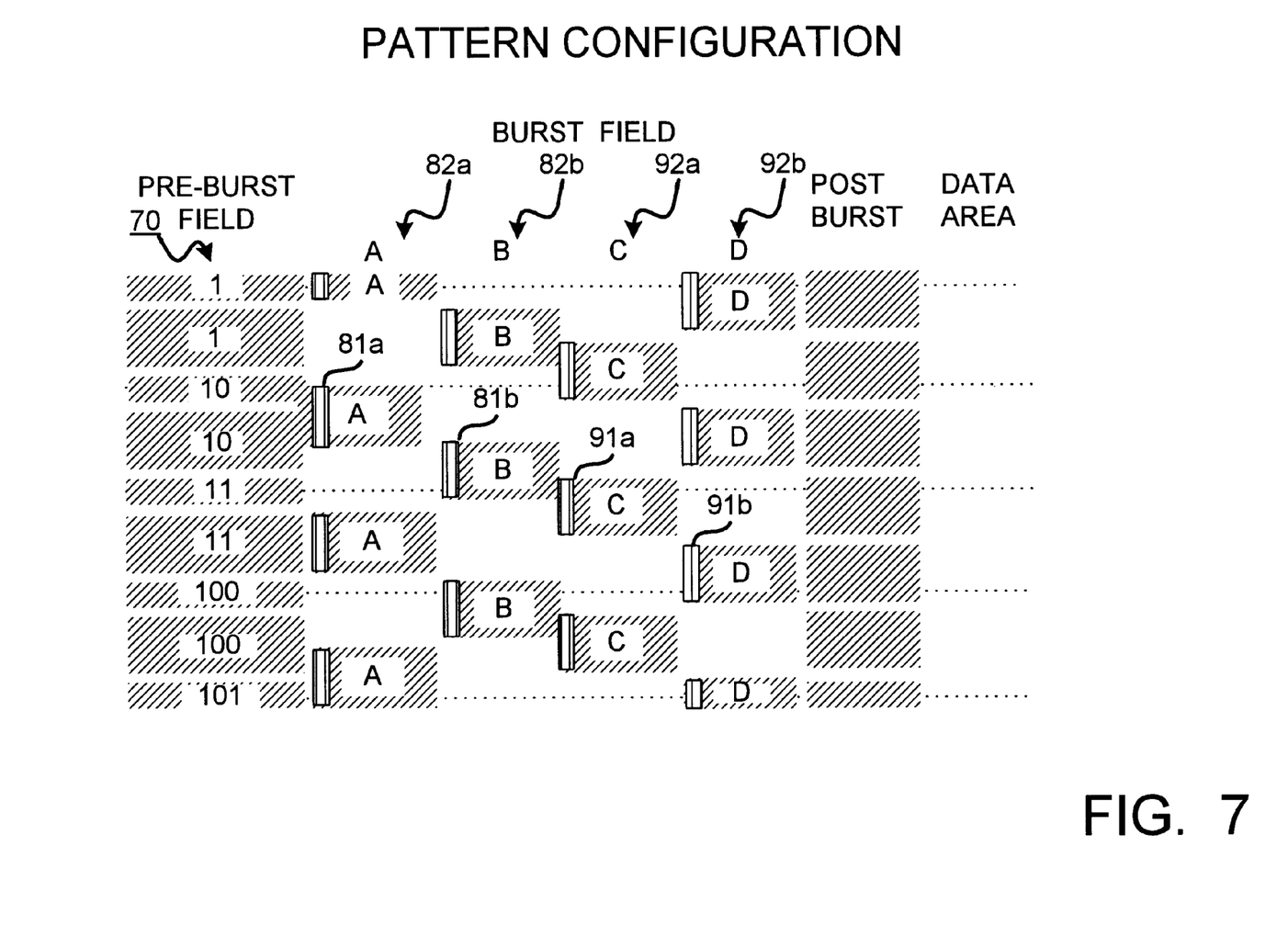
FIG. 7 is a schematic diagram of an alternate configuration using the invention where each servo burst group occupies a single position 82a–d and is preceded by a respective current ramp region 81a–d.

The present method has also been described with a servo pattern wherein the four servo bursts A, B, C, and D have been divided into two servo burst groups 82, 92, but many other variations are possible. For example, the servo bursts could be divided into servo burst groups of one burst position each. In such case, each burst position would be preceded by a current ramp region whereby each individual burst position may be independently controlled to be ACTIVE or PASSIVE on each pass of the write head. Such an arrangement is depicted in FIG. 7. Each servo burst position 82a,82b,82c, and 82d is of equal length and has a current ramp region designated respectively as 81a,81b,81c, and 81d. The bursts are written in a manner similar to that depicted in FIG. 3A–F, however the ramping of current where required takes place in the respective one of 81a–d regions.

Finally, the present invention has been described with respect to an exemplary servo pattern wherein the current ramp regions 81, 91 are the same length as the individual servo burst positions. This particular implementation could be used if it was desired that each burst begin on whole burst intervals in order to simplify timing or other considerations. Such limitations are generally unimportant to the present invention. Ideally, in fact, the current ramp regions would only be as long as needed to permit the write current to rise to a desired maximum level when turning ON, or to decay to near zero when turning OFF, in order to preserve more disk space for data.

We claim:

1. A method of seamlessly recording circumferentially successive overlapping servo bursts on a magnetic disk with successive passes of a write head that is guided by a servo track writer wherein the servo bursts are contained in at least two servo burst groups that each have at least one circumferential burst position which may contain a servo burst having a circumferential projection that radially overlaps a servo burst in another servo burst group, the method comprising the following steps during each pass of the write head:

turning a write current ON while passing the write head over a current ramp region that does not contain servo data and precedes an active servo burst group that will be modified on this pass, the write current reaching a desired maximum value within the current ramp region before the write head reaches the active servo burst group;

modifying a servo burst in the at least one circumferential position of the active servo burst group with the write current ON;

turning the write current OFF while passing the write head over a current ramp region that does not contain servo data and precedes a "passive" servo burst group that will not be modified on this pass, the write current reaching a desired minimum value within the current ramp transition region before the write head reaches the passive servo burst group; and skipping over the at least one circumferential burst position of the passive servo burst group with the write current OFF.

2. The method of claim 1 wherein the step of modifying a servo burst comprises writing a servo burst.

3. The method of claim 1 wherein the step of modifying a servo burst comprises trimming a servo burst.

4. The method of claim 1 wherein there are two servo burst groups.

5. The method of claim 4 wherein the two servo burst groups each contain two circumferential burst positions.

6. The method of claim 5 wherein a servo burst is written in a first one of the two circumferential burst positions of the active servo burst group and a servo burst is trimmed in a second one of the two circumferential burst positions of the active servo burst group.

7. The method of claim 5 further comprising the step of alternating each of the two servo burst groups between being an active servo burst group and a passive servo burst group on each pass of the write head.

8. The method of claim 7 wherein the servo bursts are $2/3$ of a track pitch wide and are offset from one another by $1/3$ of a data track pitch.

9. The method of claim 1 wherein a current ramp region is located in front of each servo burst group.

10. The method claim 9 wherein the current ramp region is less than the length of a circumferential burst position.

11. The method of claim 1 wherein the current ramp region has a length that is sufficient to allow the write current to reach the desired maximum value when turned ON and to reach the desired minimum value when turned OFF.

12. The method of claim 11 wherein the length of the current ramp region is substantially equal to the length of an circumferential burst position.

13. A method of seamlessly recording a servo pattern of four servo bursts on a magnetic disk using successive passes of a write head that is guided by a servo track writer wherein each servo burst is written as an oversized servo burst with a width corresponding to a width of the write head and then trimmed to a finished width that is less than the width of the write head, the method comprising the steps of:

offsetting the write head by a predetermined fraction of a data track pitch on successive passes of the write head wherein the write head will necessarily pass over a previously written, oversized servo burst while writing a new burst and trimming another previously written burst;

passing the write head over a first circumferential burst position while sequentially writing, skipping, trimming, and skipping, respectively, on four successive passes;

passing the write head over a second circumferential burst position while sequentially trimming, skipping, writing, and skipping respectively, on four successive passes;

passing the write head over a third circumferential burst position while sequentially skipping, trimming, skipping, and writing respectively, on four successive passes;

passing the write head over a fourth circumferential burst position while sequentially skipping, writing, skipping, and trimming respectively, on four successive passes;

turning a write current ON while passing the write head over a current ramp region that does not contain servo data before writing and trimming; and turning the write current OFF while passing the write head over a current ramp region that does not contain servo data before skipping.

14. The method of claim 13 wherein the predetermined fraction of a data track width is about $1/3$ of a data track pitch.

15. The method of claim 13 wherein the step of turning the current ON occurs while passing the write head over a current ramp region preceding each circumferential burst position.

16. The method of claim 15 wherein the step of turning the current OFF occurs while passing the write head over a current ramp preceding each circumferential burst position.

17. The method of claim 13 wherein the steps of turning the current ON and OFF occur while passing the write head over at least one current ramp region preceding a plurality of the servo burst regions.

18. The method of claim 17 wherein the steps of turning the current ON or OFF occur while passing the write head over a first current ramp preceding the first and second servo burst regions and a second current ramp region preceding the third and fourth servo burst regions.

19. The method of claim 13 wherein the current ramp regions have a length that is sufficient to allow the write current to reach a desired maximum value when turned ON and to reach a desired minimum value when turned OFF.

20. The method of claim 19 wherein the current ramp regions have a length that is substantially equal to the length of a circumferential burst position.

21. A method of recording a servo pattern on a magnetic disk using a servo track writer wherein each new burst overlaps an existing burst, the method comprising the steps of:

providing a write current to a write head;

writing a new servo burst by modulating a polarity of the write current;

removing the write current from the write head after writing the new servo burst;

permitting the write current to decay to a desired minimum value while passing the write head over a current ramp region that does not contain servo data; and passing the write head over an existing servo burst that was written on a previous pass of the write head without stitching further servo information onto the existing servo burst;

whereby each servo burst may be written as a seamless burst with a single pass of the write head.

22. The method of claim 21 wherein the step of providing write current to the head comprises the further step of permitting the write current to reach a desired maximum value while passing the head over a current ramp region that does not contain servo data.

23. The method of claim 21 comprising the further steps of:

moving the head by a desired fractional track amount; and providing a write current to the head;

trimming the new servo burst by maintaining a constant polarity of the write current;

removing the write current from the head after trimming the new servo burst;

permitting the write current to decay to a minimum value while passing the head over a current ramp region that does not contain servo data; and passing the head over an existing servo burst that was written on a previous pass of the head without trimming the existing servo burst.

24. A method of seamlessly recording a servo pattern of four servo bursts on a magnetic disk using a write head that is guided by a servo track writer wherein each servo burst is written oversized and then trimmed to a width that is less than a width of the write head, the method comprising the steps of:

offsetting the write head by a fraction of a data track pitch;

turning a write current ON while passing the write head over a current ramp region that does not contain servo data;

writing a new, oversized servo burst at a first circumferential burst position with the write current ON;

trimming a previously written, oversized servo burst at a second circumferential burst position with the write current ON;

turning the write current OFF while passing the write head over a current ramp region that does not contain servo data;

passing the write head over a third circumferential burst position containing a previously written, oversized servo burst with the write current OFF; and passing the write head over a fourth circumferential burst position with the write current OFF.

* * * * *